US009582369B2

(12) United States Patent
Kobayasi

(10) Patent No.: US 9,582,369 B2
(45) Date of Patent: Feb. 28, 2017

(54) MONITORING METHOD, MONITORING DEVICE, AND INFORMATION PROCESSING SYSTEM

(71) Applicant: FUJITSU LIMITED, Kawasaki-shi, Kanagawa (JP)

(72) Inventor: Taku Kobayasi, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 14/688,403

(22) Filed: Apr. 16, 2015

(65) Prior Publication Data

US 2015/0378851 A1 Dec. 31, 2015

(30) Foreign Application Priority Data

Jun. 25, 2014 (JP) ................................. 2014-130669

(51) Int. Cl.
| | | |
|---|---|---|
| G06F 11/00 | (2006.01) | |
| G06F 11/14 | (2006.01) | |
| G06F 11/07 | (2006.01) | |
| G06F 11/30 | (2006.01) | |

(52) U.S. Cl.
CPC ...... *G06F 11/1441* (2013.01); *G06F 11/0709* (2013.01); *G06F 11/0787* (2013.01); *G06F 11/3055* (2013.01)

(58) Field of Classification Search
CPC ............. G06F 11/1471; G06F 11/1402; G06F 11/1443
See application file for complete search history.

(56) References Cited

U.S. PATENT DOCUMENTS

| | | | | |
|---|---|---|---|---|
| 7,315,826 B1* | 1/2008 | Guheen | ............... | G06F 17/3089 703/27 |
| 2006/0053181 A1* | 3/2006 | Anand | ................ | G06F 11/0715 |
| 2006/0053304 A1* | 3/2006 | Fries | .................. | G06F 11/1451 713/189 |
| 2006/0053334 A1* | 3/2006 | Ingen | .................. | G06F 11/1466 714/2 |
| 2015/0309889 A1* | 10/2015 | Campbell | ........... | G06F 11/1469 714/16 |

FOREIGN PATENT DOCUMENTS

| | | |
|---|---|---|
| JP | 2005-509947 | 4/2005 |
| WO | WO 03/042844 | 5/2003 |

* cited by examiner

*Primary Examiner* — Charles Ehne
(74) *Attorney, Agent, or Firm* — Staas & Halsey LLP

(57) ABSTRACT

A monitoring method that is executed by a monitoring device that monitors communication between an information processing device from among a plurality of information processing devices and a switching device that is coupled to a peripheral device that includes at least one of an input device and an output device, the monitoring method includes storing information on a recovery method for each process of the communication, in a memory; detecting the communication between the information processing device and the switching device; determining whether a failure has occurred in the detected communication by analyzing the detected communication for each of the processes; and executing restoration processing of recovering the detected communication, based on information on the recovery method corresponding to a failed process among the processes, which is stored in the memory when it is determined that the failure has occurred in the detected communication.

11 Claims, 14 Drawing Sheets

FIG. 2A

| PORT NUMBER | PACKET ID | TIME AFTER RECEPTION |
|---|---|---|
| 1 | 128 | 200ms |
| 1 | 129 | 220ms |
| 1 | 132 | 250ms |
| | | |

FIG. 2B

| OCCURRENCE KVM PORT | OCCURRENCE PHASE | OCCURRED PROBLEM | RESTORATION PROCESSING RESULT |
|---|---|---|---|
| 1 | ORDINARY USAGE | COMMAND RESPONSE TIMEOUT | NORMAL |
| 1 | POWER-SAVING | ORDINARY USAGE PHASE TRANSITION FAILURE | NORMAL |
| ... | ... | ... | ... |
| 1 | CONNECTION CONFIRMATION | Config COMMAND RECEPTION TIMEOUT | ABNORMAL |
| | | | |

FIG. 2C

| TARGET PHASE | PHASE DETERMINATION CONDITION | PROBLEM DETERMINATION REFERENCE | RESTORATION PROCESSING |
|---|---|---|---|
| CONNECTION CONFIRMATION | APPLICATION OF POWER TO PORT | RECEPTION TIMEOUT OF Config COMMAND OF SERVER (1 MIN) | PULLING DOWN OF USB SIGNAL OF PORT CONTROLLER FOR 100 MS TO CAUSE NON-INITIALIZATION STATE |
| DEVICE RECOGNITION | INITIALIZATION COMMAND ISSUANCE FROM SERVER | TIMEOUT OF Int COMMAND ISSUANCE OF SERVER (3 MIN) | PULLING DOWN OF USB SIGNAL OF PORT CONTROLLER FOR 100 MS TO CAUSE NON-INITIALIZATION STATE |
| ORDINARY USAGE | POLLING COMMAND ISSUANCE FROM SERVER | TIMEOUT OF ACK/NACK ISSUANCE OF KVM SWITCH CORRESPONDING TO Int COMMAND OF SERVER (500 MS) | ISSUANCE OF NACK (RESPONSE IS NOT SENT BACK DUE TO "BUSY") TO SERVER INSTEAD OF KVM SWITCH |
| POWER-SAVING | ISSUANCE OF Config COMMAND "POWER-SAVING PHASE TRANSITION" FROM SERVER TO KVM SWITCH | RE-ISSUANCE OF "POWER-SAVING PHASE TRANSITION" THAT IS RESPONSE OF SERVER WHEN RESPONSE FROM KVM SWITCH IS "POWER-SAVING PHASE TERMINATION" | SUPPRESSION OF RESPONSE OF "POWER-SAVING MODE TERMINATION" FOR 500 MS, FOR MAIN CONTROLLER OF KVM SWITCH |
|  |  |  |  |
|  |  |  |  |
|  |  |  |  |

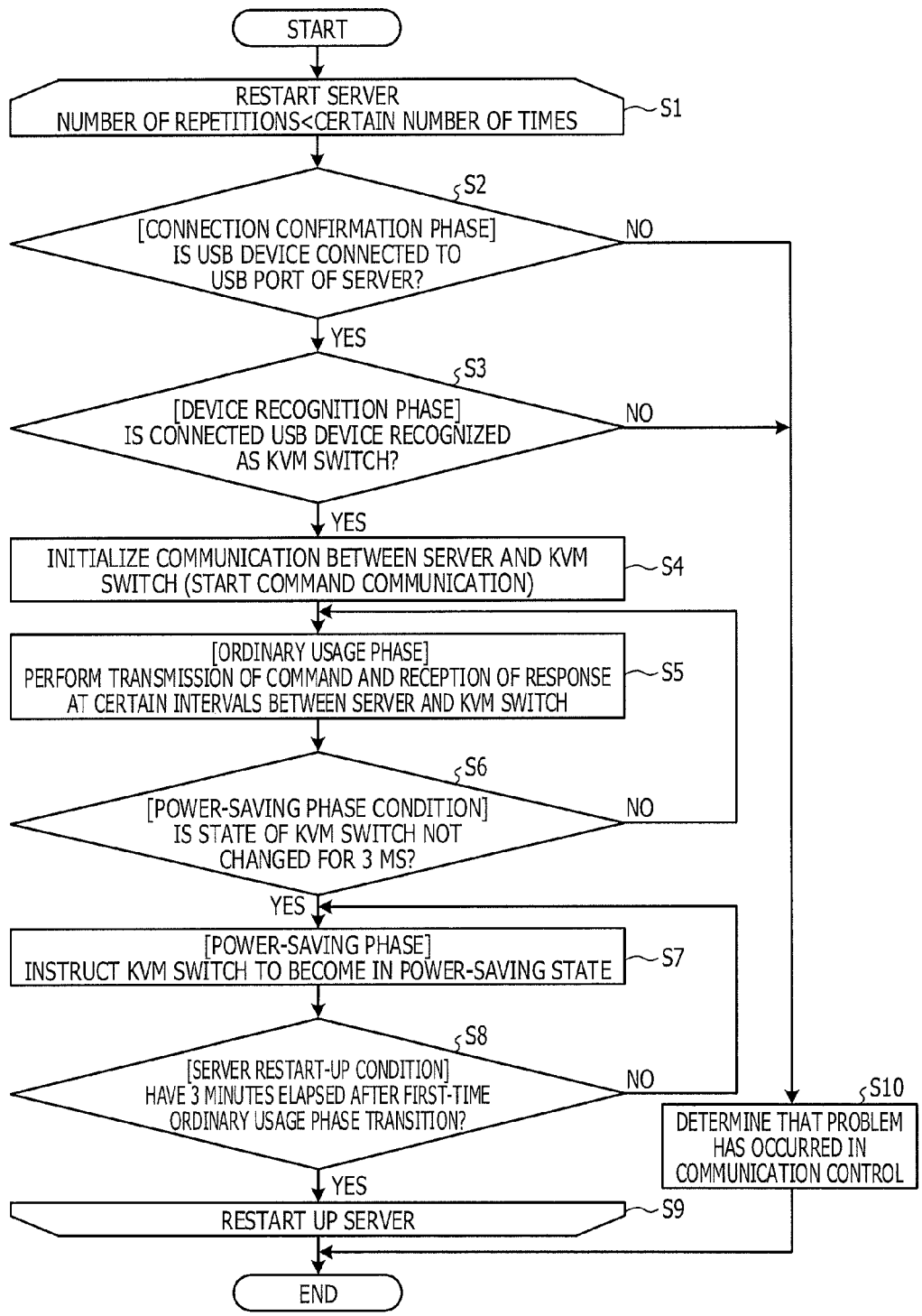

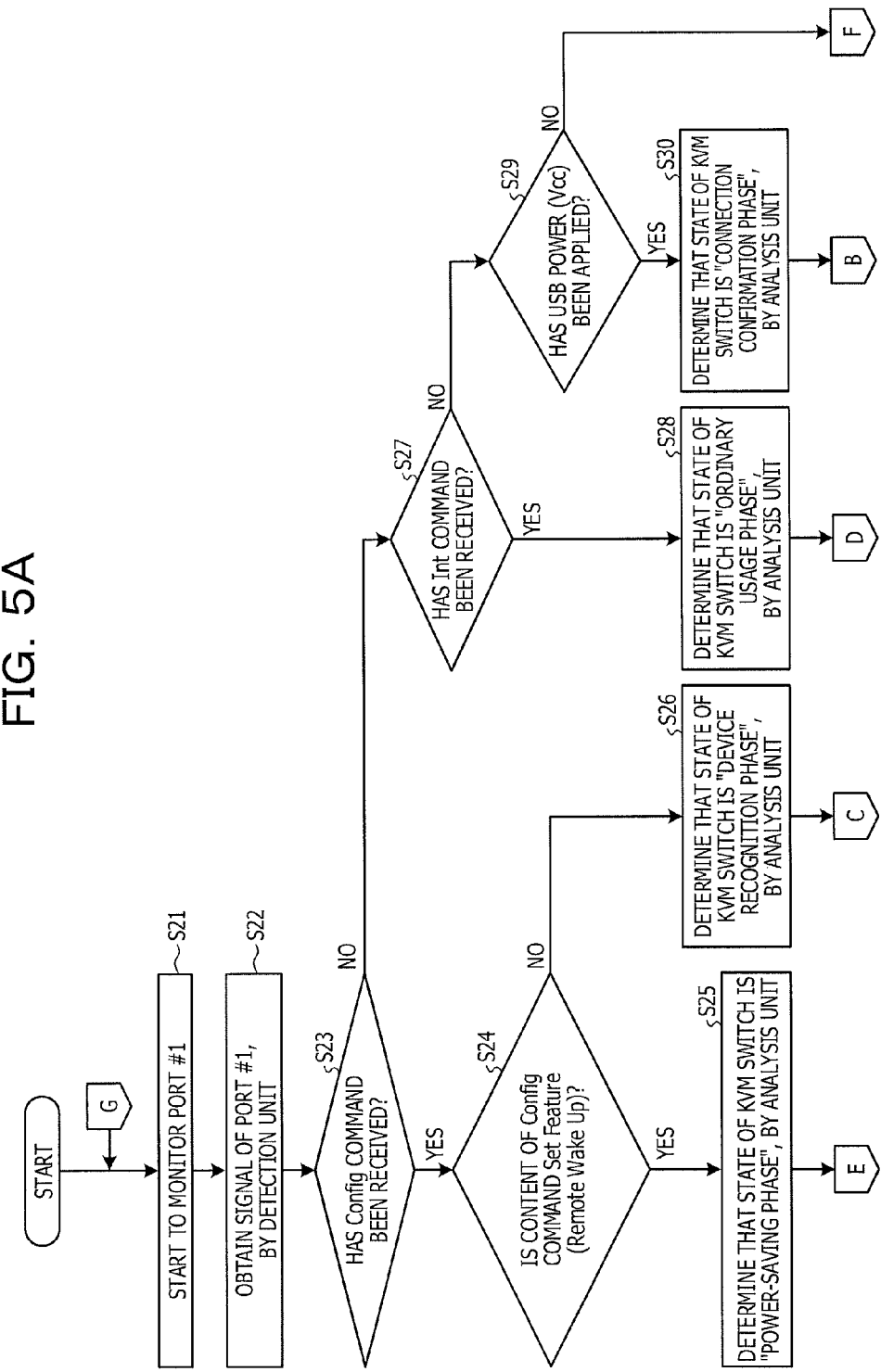

MONITORING METHOD, MONITORING DEVICE, AND INFORMATION PROCESSING SYSTEM

CROSS-REFERENCE TO RELATED APPLICATION

This application is based upon and claims the benefit of priority of the prior Japanese Patent Application No. 2014-130669, filed on Jun. 25, 2014, the entire contents of which are incorporated herein by reference.

FIELD

The embodiments discussed herein are related to a monitoring method, a monitoring device, and an information processing system.

BACKGROUND

A KVM switch is a switch that is used to monitor and operate a plurality of servers using a set of a monitor, a keyboard, and a mouse. Here, the server is a computer that provides information processing service. Here, "KVM" represents "K" of a Keyboard, "V" of a Visual Unit, and "M" of a Mouse.

FIG. 9 is a diagram illustrating a KVM switch. As illustrated in FIG. 9, to the KVM switch 2, eight servers 1 that are referred to as servers #1 to #8, a keyboard 3, a mouse 4, and a monitor 5 are coupled. The KVM switch 2 switches connection of one of the eight servers 1, to the keyboard 3, the mouse 4, and the monitor 5.

The KVM switch 2 and each of the servers 1 are coupled to each other through a KVM switch cable. The KVM switch cables include signal cables of the keyboard 3, the mouse 4, and the monitor 5. The KVM switch 2 and each of the keyboard 3 and the mouse 4 are coupled to each other through a Universal Serial Bus (USB). The monitor 5 and the KVM switch 2 are coupled to each other through a Video Graphics Array (VGA).

There is a technology in a related art, in which, due to a signal switch that is obtained by combining a KVM switch and a peripheral device sharing switch, all computers that are coupled to the signal switch share all USB peripheral devices that are coupled to the signal switch. As the related art, for example, Japanese Unexamined Patent Publication (Translation of PCT application) No. 2005-509947 has been disclosed.

In the development of a new KVM switch, the connection compatibility with an existing server model is verified. Firmware of the KVM switch is tuned when a problem occurs in the verification of the connection compatibility, so that the verification is posed during the tuning. Thus, when a connection problem occurs during the verification, the verification is stopped, thereby causing a problem that the verification time period is increased.

In the USB, a protocol defining how the communication is to be performed is formulated by a standard. However, a manufacturer defines the unique specification in some points other than the protocol. Therefore, even when a keyboard and a mouse that are compliant with the USB standard are used, the verification of the connection compatibility is performed. In the verification of the connection compatibility, a certain verification operation is repeated in order to confirm that a problem does not occur under various circumstances. Therefore, once the verification work is stopped, it is desirable that the verification operation is repeated from the beginning, so that the verification time period is increased.

SUMMARY

According to an aspect of the invention, a monitoring method that is executed by a monitoring device that monitors communication between a information processing device from among a plurality of information processing devices and a switching device that is coupled to a peripheral device that includes at least one of an input device and an output device, the monitoring method includes storing information on a recovery method for each process of the communication, in a memory; detecting the communication between the information processing device and the switching device; determining whether a failure has occurred in the detected communication by analyzing the detected communication for each of the processes; and executing restoration processing of recovering the detected communication, based on information on the recovery method corresponding to a failed process among the processes, which is stored in the memory when it is determined that the failure has occurred in the detected communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating an example of a command buffer;

FIG. 2B is a diagram illustrating an example of a history table;

FIG. 2C is a diagram illustrating an example of an analysis table;

FIG. 3 is a flowchart illustrating a flow of verification processing of connection compatibility between a server and a KVM switch;

FIG. 5A is a flowchart illustrating a flow of phase determination processing;

DESCRIPTION OF EMBODIMENTS

Embodiments of a monitoring device, an information processing system, and a monitoring method that are related to a technology discussed herein are described below with reference to drawings. The technology discussed herein is not limited to the embodiments.

Embodiments

Figure 1:
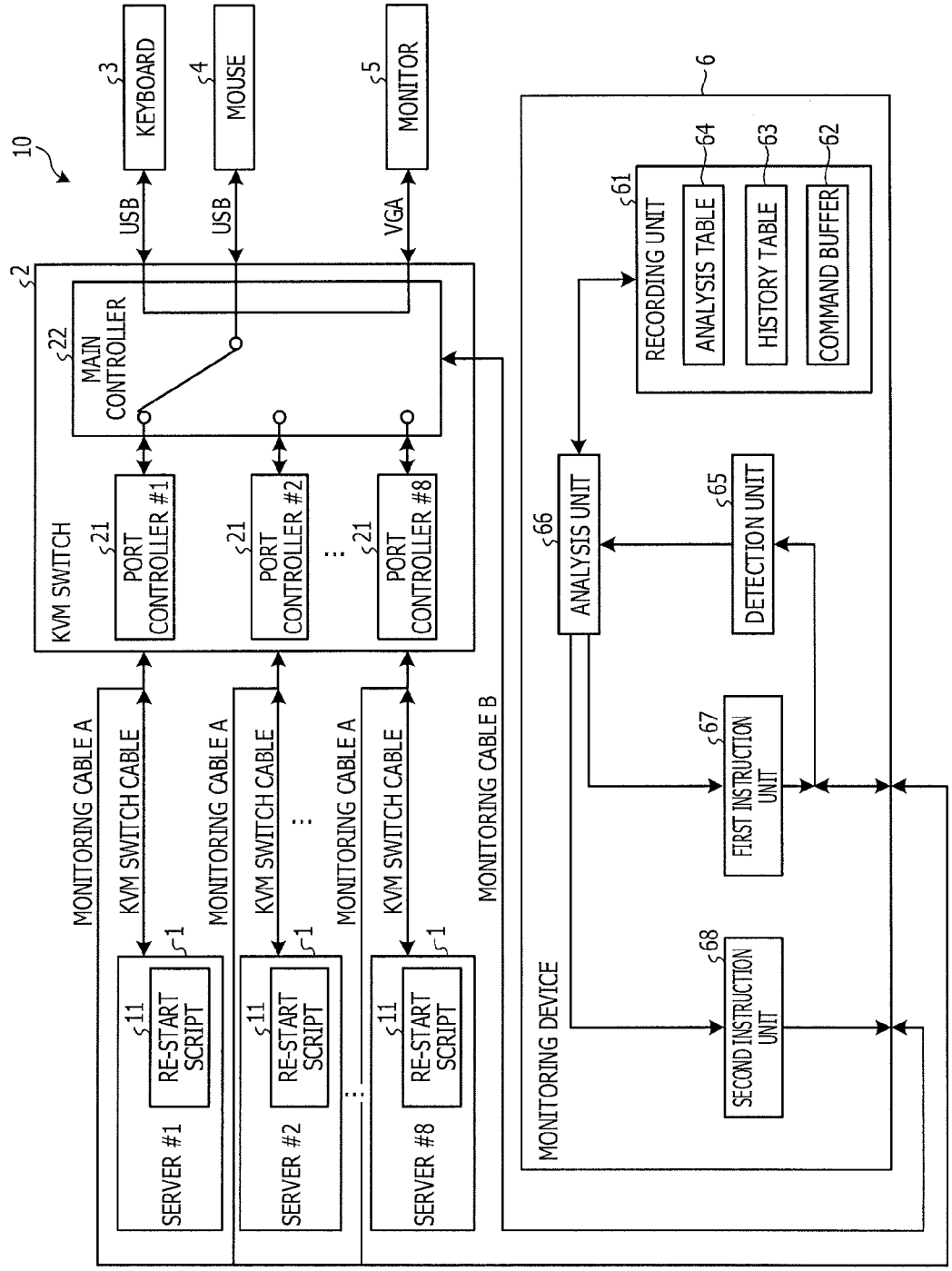
FIG. 1 is a diagram illustrating a configuration of an information processing system according to an embodiment.

First, a configuration of an information processing system according to an embodiment is illustrated. FIG. 1 is a diagram illustrating the configuration of the information processing system according to the embodiment. As illustrated in FIG. 1, an information processing system 10 includes eight servers 1 that are respectively referred to as servers #1 to #8, a KVM switch 2, a keyboard 3, a mouse 4, a monitor 5, and a monitoring device 6. Here, for convenience of description, the eight servers 1 are illustrated, but the information processing system 10 may include, for example, any number of servers 1 such as four, 16, or 32 servers.

The server 1 is a computer that provides information processing service. The server 1 is restarted by a number of times, at the time of verification of the connection compatibility with the KVM switch 2, using a re-start script 11.

The KVM switch 2 is a switch that performs switching of a server 1 from among the eight servers 1 with the keyboard 3, the mouse 4, and the monitor 5. By using the KVM switch 2, in the information processing system 10 a set of the keyboard 3, the mouse 4, and the monitor 5 may be shared between the eight servers 1.

The KVM switch 2 includes eight port controllers 21 that are referred to as port controllers #1 to #8 that respectively correspond to the servers #1 to #8, and a main controller 22. The port controller 21 is coupled to the corresponding server 1 through a KVM switch cable.

The main controller 22 switches connection of one of the port controllers 21 with the keyboard 3, the mouse 4, and the monitor 5. Due to the switching through the main controller 22, the keyboard 3, the mouse 4, and the monitor 5 are coupled to any one of the servers 1. Here, for convenience of description, the case is descried in which switching between the eight servers 1 is performed through the KVM switch 2. The KVM switch 2 may perform switching between more or less than the eight servers 1.

The keyboard 3 is an input device that is used for input of characters and the like to the server 1 that is coupled to the keyboard 3 through the KVM switch 2. The mouse 4 is an instruction device that is used for selection of an item that is displayed on the monitor 5, scroll of a screen, and the like. The monitor 5 is a display device that displays the screen that is output from the server 1 that is coupled to the monitor 5 through the KVM switch 2.

The monitoring device 6 monitors communication between the server 1 and the KVM switch 2, that is, communication through the KVM switch cable, using a monitoring cable A, at the time of verification of the connection compatibility between the server 1 and the KVM switch 2. In addition, the monitoring device 6 determines whether or not the communication is being performed normally. The monitoring cable A is coupled to the KVM switch cable so as to be branched into the KVM switch cable to form a T-shape.

In addition, when the monitoring device 6 determines that the communication is not being performed normally, the monitoring device 6 issues an instruction for the recovery, to the server 1 or the port controller 21, using the monitoring cable A. Alternatively, when the monitoring device 6 determines that the communication is not being performed normally, the monitoring device 6 issues an instruction for the recovery, to the main controller 22, using a monitoring cable B.

The monitoring device 6 includes a recording unit 61, a detection unit 65, an analysis unit 66, a first instruction unit 67, and a second instruction unit 68. The recording unit 61 performs a recording of a monitoring result, and stores pieces of information that are used for monitoring and recovery. The recording unit 61 includes a command buffer 62, a history table 63, and an analysis table 64.

The command buffer 62 stores a command that has been transmitted and received between the server 1 and the KVM switch 2. FIG. 2A is a diagram illustrating an example of the command buffer 62. As illustrated in FIG. 2A, the command buffer 62 stores a port number, a packet ID, and a time after reception so as to associates the port number, the packet ID, with the time after reception, for each command.

The port number is the number of a port through which transmission and reception of a command have been performed in the KVM switch 2. The packet ID is an identifier that is used to identify the packet of the command the transmission and reception of which have been performed. The time after reception is an elapsed time after the monitoring device 6 has received a command. For example, in a command that has been received at the port controller #1, the identifier of the packet is "128", and "200 millisecond (ms)" has elapsed after the reception.

The history table 63 stores information on a failure that has occurred and the recovery for the failure in the communication between the server 1 and the KVM switch 2. FIG. 2B is a diagram illustrating an example of the history table 63. As illustrated in FIG. 2B, the history table 63 stores an occurrence KVM port, an occurrence phase, an occurred problem, and a restoration processing result, for each occurred failure.

The occurrence KVM port is a number of a port in which a communication failure has occurred in the KVM switch 2. The occurrence phase is a phase in which the communication failure has occurred. As the phase, there are a connection confirmation phase, a device recognition phase, an ordinary usage phase, and a power-saving phase.

In the connection confirmation phase, the server 1 confirms the state of the USB port, and confirms whether the USB port is a free port or a USB device is coupled to the USB port. When the connection is confirmed in the connection confirmation phase, the phase of the communication between the server 1 and the KVM switch 2 transitions to the device recognition phase. In the device recognition phase, the server 1 inquires about an included function, for the USB device the connection of which has been confirmed in the connection confirmation phase, and performs desired setting.

In the ordinary usage phase, the server 1 performs a device-specific operation, based on the setting that has been performed in the device recognition phase. The server 1 recognizes the USB device that is coupled to the server 1, as the KVM switch 2. Therefore, the server 1 mainly exchanges a polling (state inquiry at certain intervals) command and the response command, with the KVM switch 2.

The power-saving phase is a phase that exists only in devices that are manipulated by a user such as the KVM switch 2, the keyboard 3, and the mouse 4 in the USB device. The server 1 instructs the KVM switch 2 to transition to the power-saving phase when a response that indicates "there is no change in the state of the device" is merely sent back for 3 ms, in the polling of the ordinary usage phase.

The occurred problem is a problem that has occurred during the communication. The restoration processing result is a result of restoration processing that has been executed on the occurred problem. To the restoration processing result, "normal" is recorded when the recovery has been performed successfully, and "abnormal" is recorded when the recovery has not been performed successfully.

For example, in FIG. 2B, the first entry indicates that a command response timeout has occurred in the ordinary usage phase, and the recovery has been performed successfully as a result of execution of restoration processing, in the port controller #1.

The analysis table 64 stores information that is used for communication analysis and restoration processing at the time of an occurrence of a failure. The analysis table 64 is created based on a failure that has occurred at the time of the previous verification, and restoration processing. FIG. 2C is a diagram illustrating an example of the analysis table 64. As illustrated in FIG. 2C, the analysis table 64 stores a target phase, a phase determination condition, a problem determination reference, and restoration processing.

The target phase is a phase that is a target of analysis. The phase determination condition is a condition that is used to determine that the phase is the target phase. The problem determination reference is a reference that is used to determine whether or not a failure has occurred in the communication. The restoration processing is processing that is executed for the recovery when a failure has occurred in the communication.

For example, in FIG. 2C, the first entry indicates that a failure of a reception timeout occurs, and restoration processing is executed in a case in which a Config command is not issued from the server 1 even when one minute has elapsed after the transition to the connection confirmation phase that is the phase that follows application of power to the port. In the restoration processing, a USB signal of the port controller 21 is pulled down for 100 ms to cause a non-initialization state. The Config command is a command that is transmitted from the server 1 to the USB device. The Config command is used for inquiry about information on the USB device, setting of the USB device, and the like.

The second entry indicates that a failure of a timeout occurs, and the restoration processing is executed in a case in which an Int command is not issued from the server 1 even when three minutes have elapsed in the device recognition phase that is the phase that follows issuance of the initialization command from the server 1. In the restoration processing, a USB signal of the port controller 21 is pulled down for 100 ms to cause a non-initialization state.

The third entry indicates that a failure of an ACK/NACK issuance timeout of the KVM switch 2 occurs, and restoration processing is executed when 500 ms have elapsed after the polling of the server 1 in the ordinary usage phase that is the phase that follows the polling command issuance from the server 1. In the restoration processing, issuance of a NACK is performed on the server 1, instead of the KVM switch 2. Here, the NACK indicates that the response is not sent back due to "Busy".

The fourth entry indicates that a failure occurs, and restoration processing is executed in the power-saving phase that is the phase that follows issuance of a Config command "power-saving phase transition" from the server 1 to the KVM switch 2. In a case in which a response from the KVM switch 2 is "power-saving phase termination", when a failure occurs in which a response of the server 1 is re-issuance of "power-saving phase transition", the restoration processing is executed that causes the main controller 22 of the KVM switch 2 to suppress a response of "power-saving mode termination" for 500 ms.

Returning to FIG. 1, the detection unit 65 receives communication between the server 1 and the KVM switch 2, and sends the received content to the analysis unit 66. The analysis unit 66 analyzes the received content, and determines whether or not a failure has occurred in the communication, based on the problem determination reference of the analysis table 64. In addition, when the analysis unit 66 determines that a failure has occurred in the communication, the analysis unit 66 instructs the first instruction unit 67 or the second instruction unit 68 to execute the restoration processing that is stored in the analysis table 64, for the failure.

The analysis unit 66 determines whether or not the recovery has been performed successfully. The analysis unit 66 controls the monitoring device 6 to continue the monitoring when the recovery has been performed successfully, and controls the monitoring device 6 to stop the operation when the recovery has not been performed successfully. The analysis unit 66 instructs the recording unit 61 to perform a recording of the occurred failure, the restoration processing result, and the like, to the history table 63.

The first instruction unit 67 sends the response to the server 1 instead of the KVM switch 2, through the monitoring cable A, based on the instruction of the analysis unit 66. Alternatively, the first instruction unit 67 issues an instruction to the port controller 21, through the monitoring cable A, based on the instruction of the analysis unit 66. The second instruction unit 68 issues an instruction to the main controller 22, through the monitoring cable B, based on the instruction of the analysis unit 66.

A flow of verification processing of the connection compatibility between the server 1 and the KVM switch 2 is described below. FIG. 3 is a flowchart illustrating the flow of the verification processing of the connection compatibility between the server 1 and the KVM switch 2. As illustrated in FIG. 3, the server 1 repeats re-start by the certain number of times and executes processing between S1 to S9 each time the re-start is performed.

In the processing that is executed each time the re-start is performed, first, in the connection confirmation phase, the server 1 determines whether or not a USB device is coupled to the USB port of the server 1 (S2). When the server 1 determines that a USB device is not coupled to the USB port of the server 1 (S2: No), the server 1 determines that a problem has occurred in the communication control (S10), and the processing ends.

On the other hand, when the server 1 determines that a USB device is coupled to the USB port of the server 1 (S2: Yes), the phase proceeds the device recognition phase, and the server 1 determines whether or not the coupled USB device is recognized as the KVM switch 2, in the device recognition phase (S3). When the server 1 determines that the coupled USB device is not recognized as the KVM switch 2 (S3: No), the server 1 determines that a problem has occurred in the communication control (S10), and the processing ends.

On the other hand, when the server 1 determines that the coupled USB device is recognized as the KVM switch 2 (S3: Yes), the server 1 initializes the communication between the server 1 and the KVM switch 2, and starts the command communication (S4). In addition, in the ordinary usage phase, the server 1 performs transmission of a command and reception of the response with the KVM switch 2, at certain intervals (S5).

In addition, as a condition under which the phase transitions to the power-saving phase, the server 1 determines whether or not the state of the KVM switch 2 is not changed for 3 ms (S6). When the server 1 determines that the state of the KVM switch 2 has been changed within 3 ms (S6: No), in the server 1, the flow returns to S5.

On the other hand, when the server 1 determines that the state of the KVM switch 2 has not been changed for 3 ms (S6: Yes), the server 1 instructs the KVM switch 2 to become in the power saving state (S7). In addition, as a condition under which the re-start is performed, the server 1 determines whether or not three minutes have elapsed after the first-time ordinary usage phase transition (S8). When the server 1 determines that three minutes have elapsed (S8: Yes), the server 1 is restarted. On the other hand, the server 1 determines that three minutes do not elapse (S8: No), the flow returns to S7.

Figure 4:
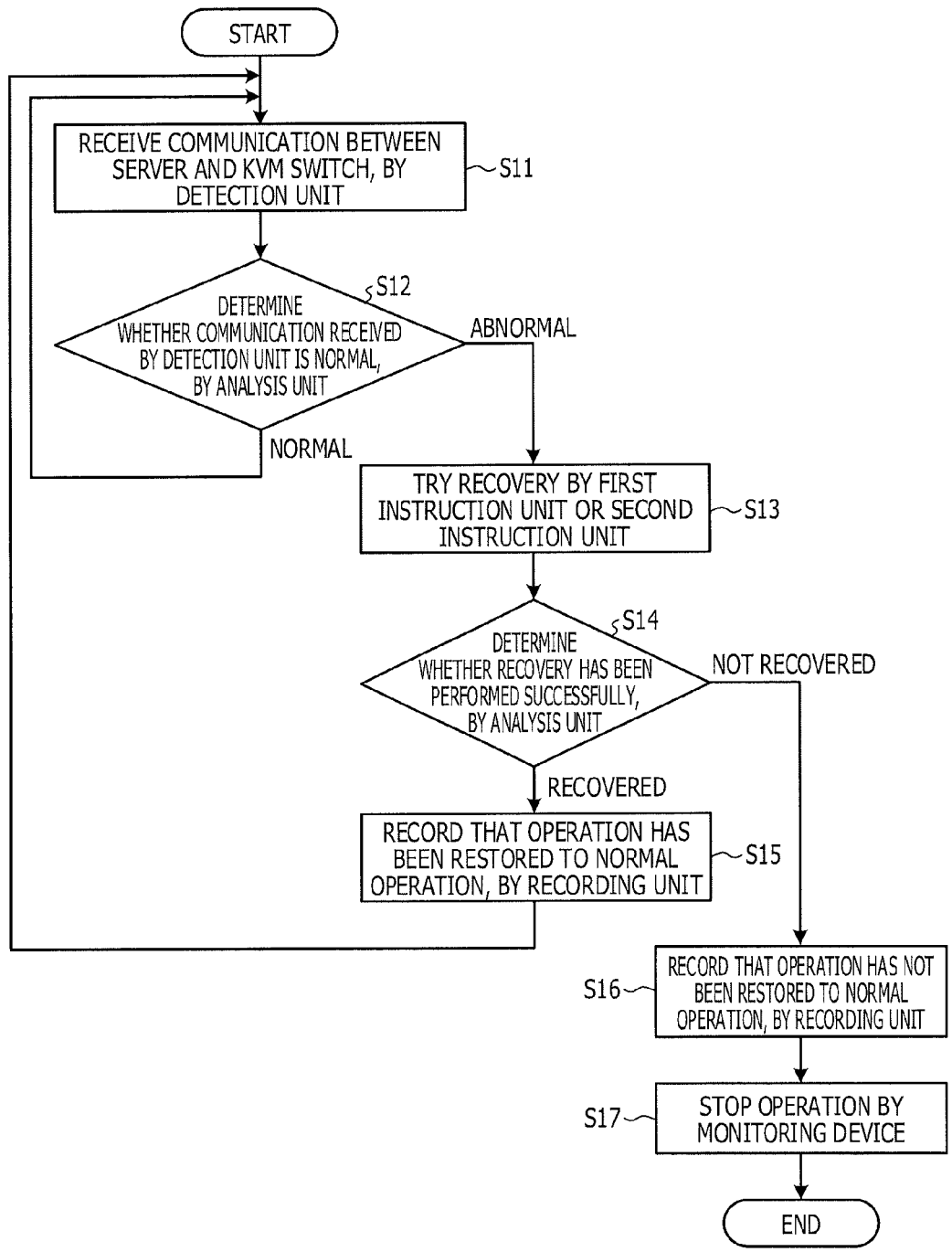
FIG. 4 is a flowchart illustrating a flow of processing of a monitoring device.

As described above, the server 1 performs communication with the KVM switch 2 while repeating the re-start. During the time, the monitoring device 6 monitors the communication between the server 1 and the KVM switch 2. FIG. 4 is a flowchart illustrating a flow of processing of the monitoring device 6.

As illustrated in FIG. 4, the detection unit 65 of the monitoring device 6 receives the communication between the server 1 and the KVM switch 2 (S11), and transmits the communication to the analysis unit 66. The analysis unit 66 determines whether or not the communication that has been received at the detection unit 65 is normal (S12). When the analysis unit 66 determines that the communication is normal (S12: Yes), in the monitoring device 6, the flow returns to S11.

On the other hand, when the analysis unit 66 determines that the communication is not normal (S12: No), the first instruction unit 67 or the second instruction unit 68 tries the recovery for a known problem for which an adjustment method has been established (S13). After that, the analysis unit 66 determines whether or not the recovery has been performed successfully (S14). When the analysis unit 66 determines that the recovery has been performed successfully (S14: Yes), the recording unit 61 records that the operation has been restored to the normal operation (S15), and in the monitoring device 6, the flow returns to S11. On the other hand, when the analysis unit 66 determines that the recovery has not been performed successfully (S14: No), the recording unit 61 records that the operation has not been restored to the normal operation (S16), and the monitoring device 6 terminates the operation (S17).

As described above, when a failure has occurred in the communication between the server 1 and the KVM switch 2, the monitoring device 6 tries the recovery for a known problem for which an adjustment method has been established. Therefore, when the recovery has been performed successfully, the server 1 is allowed to continue the verification processing of the connection compatibility.

Figure 5B:
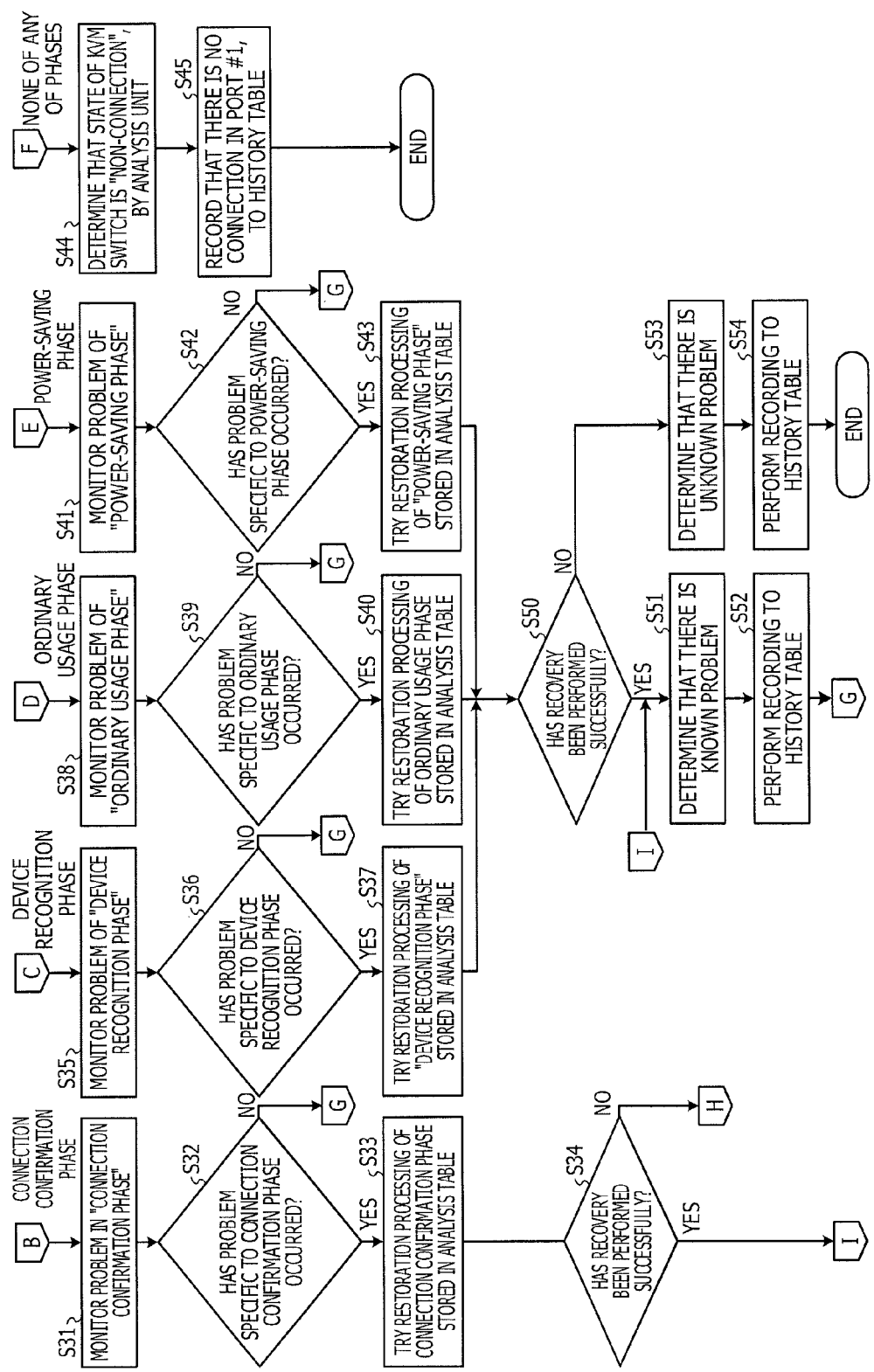
FIGS. 5B and 5C are flowcharts illustrating a flow of counter-measure processing.
Figure 5C:
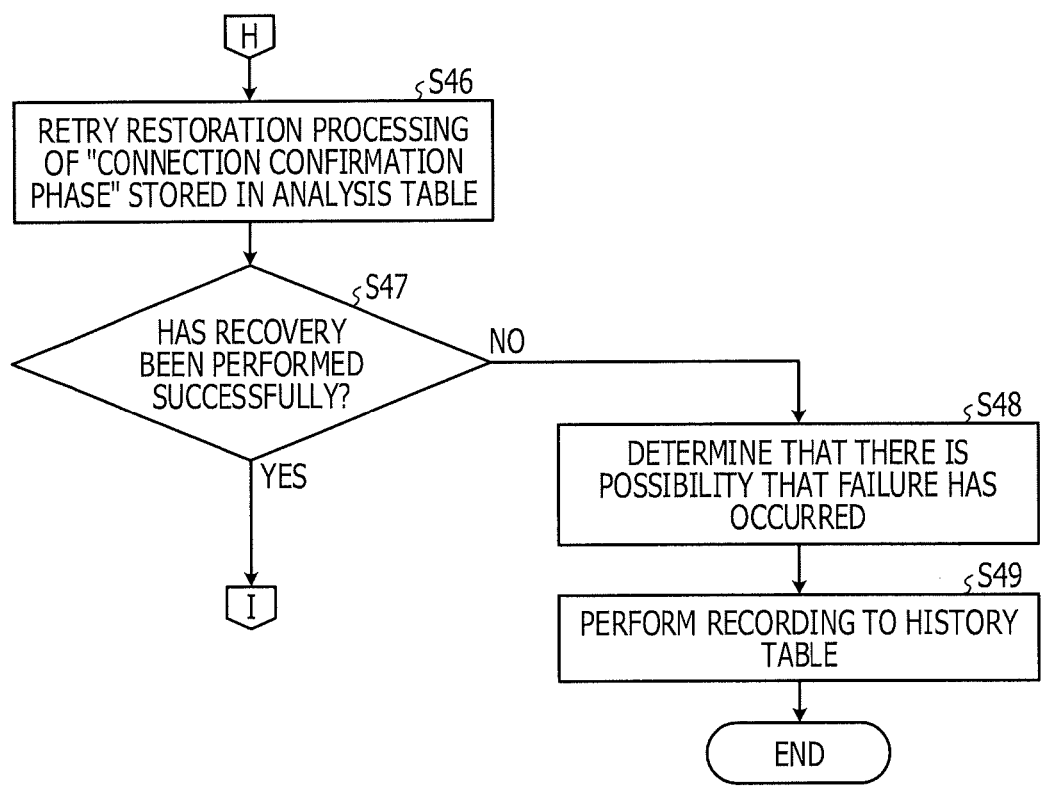

The detail of a flow of the processing of the monitoring device 6 is described below. FIG. 5A is a flowchart illustrating a flow of phase determination processing. FIG. 5B and FIG. 5C are flowcharts illustrating a flow of countermeasure processing. Here, a case is described below in which the monitoring device 6 monitors communication between the port #1 and the server #1 that corresponds to the port controller #1.

As illustrated in FIG. 5A, the monitoring device 6 starts to monitor the port #1 (S21). In addition, the detection unit 65 of the monitoring device 6 obtains a signal of the port #1 (S22). In addition, the detection unit 65 determines whether or not a Config command has been received (S23). When the detection unit 65 determines that a Config command has been received (S23: Yes), the detection unit 65 determines whether or not the content of the Config command is "Set Feature (Remote Wake Up)" (S24). Here, "Set Feature (Remote Wake Up)" instructs the USB device to transition to the power-saving phase.

In addition, when the detection unit 65 determines that the content of the Config command is "Set Feature (Remote Wake Up)" (S24: Yes), the analysis unit 66 determines that the state of the KVM switch 2 as "power-saving phase" (S25). On the other hand, when the detection unit 65 determines that the content of the Config command is not "Set Feature (Remote Wake Up)" (S24: No), the analysis unit 66 determines that the state of the KVM switch 2 as "device recognition phase" (S26).

On the other hand, when the detection unit 65 determines that a Config command is not received in S23 (S23: No), the detection unit 65 determines whether or not an Int command has been received (S27). When the detection unit 65 determines that an Int command has been received (S27: Yes), the analysis unit 66 determines that the state of the KVM switch 2 as "ordinary usage phase" (S28).

On the other hand, when the detection unit 65 determines that an Int command is not received (S27: No), the detection unit 65 determines whether or not the USB power has been applied (S29). When the analysis unit 66 determines that the USB power has been applied (S29: Yes), the analysis unit 66 determines the state of the KVM switch 2 as "connection confirmation phase" (S30). On the other hand, when the detection unit 65 determines that the USB power is not applied (S29: No), the analysis unit 66 determines the state of the KVM switch 2 as "non-connection", as illustrated in FIG. 5B (S44). In addition, the recording unit 61 records to the history table 63 that there is no connection in the port #1 (S45), and in the monitoring device 6, the processing ends.

When the analysis unit 66 determines the state of the KVM switch 2 as "connection confirmation phase" in S30 of FIG. 5A, the analysis unit 66 monitors a problem of "connection confirmation phase", as illustrated in FIG. 5B (S31). After that, the analysis unit 66 determines whether or not a problem that is specific to the connection confirmation phase has occurred (S32). When the analysis unit 66 determines that the problem has not occurred, in the monitoring device 6, the flow returns to S21. On the other hand, when the analysis unit 66 determines that the problem has not occurred, the monitoring device 6 tries the restoration processing of "connection confirmation phase", which is stored in the analysis table 64 (S33). In addition, the analysis unit 66 determines whether or not the recovery has been performed successfully (S34).

When the analysis unit 66 determines that the recovery has been performed successfully (S34: Yes), in the monitoring device 6, the flow proceeds S51. On the other hand, when the analysis unit 66 determines that the recovery has not been performed successfully (S34: No), as illustrated in FIG. 5C, the monitoring device 6 retries the restoration processing of "connection confirmation phase", which is stored in the analysis table 64 (S46). In addition, the analysis unit 66 determines whether or not the recovery has been performed successfully (S47). When the analysis unit 66 determines the recovery has been performed successfully (S47: Yes), in the monitoring device 6, the flow proceeds S51. On the other hand, when the analysis unit 66 determines that the recovery has not been performed successfully (S47: No), the analysis unit 66 determines that there is a possibility that a failure has occurred (S48). In addition, the recording unit 61 records a history of the processing to the history table 63 (S49). In addition, in the monitoring device 6, the processing ends.

When the state is determined as "device recognition phase", the analysis unit 66 monitors a problem of "device recognition phase" (S35), and determines whether or not a problem that is specific to the device recognition phase has not occurred (S36). When the analysis unit 66 determines that the problem has not occurred (S36: Yes), in the monitoring device 6, the flow returns to S21. On the other hand, when the analysis unit 66 determines that the problem has occurred (S36: No), the monitoring device 6 tries the restoration processing of "device recognition phase", which is stored in the analysis table 64 (S37). In addition, the analysis unit 66 determines whether or not the recovery has been performed successfully (S50).

When the analysis unit 66 determines that the recovery has been performed successfully (S50: Yes), the analysis unit 66 determines the problem as a known problem (S51). After that, the recording unit 61 records a history of the processing to the history table 63 (S52). In addition, in the monitoring device 6, the flow returns to S21. On the other hand, when the analysis unit 66 determines that the recovery has not been performed successfully (S50: No), the analysis unit 66 determines the problem as an unknown problem (S53). In addition, the recording unit 61 records a history of the processing to the history table 63 (S54). In addition, in the monitoring device 6, the processing ends.

When the analysis unit 66 determines the state as "ordinary usage phase", the analysis unit 66 monitors a problem of "ordinary usage phase" (S38). After that, the analysis unit 66 determines whether or not a problem that is specific to the ordinary usage phase has not occurred (S39). When the analysis unit 66 determines that the problem has not occurred (S39: Yes), in the monitoring device 6, the flow returns to S21. On the other hand, when the analysis unit 66 determines that the problem has occurred (S39: No), the monitoring device 6 tries the restoration processing of "ordinary usage phase", which is stored in the analysis table 64 (S40). In addition, in the monitoring device 6, the flow proceeds to S50.

When the analysis unit 66 determines the state as "power-saving phase", the analysis unit 66 monitors a problem of "power-saving phase" (S41). In addition, the analysis unit 66 determines whether or not a problem that is specific to the power-saving phase has not occurred (S42). When the analysis unit 66 determines that the problem has not occurred (S42: Yes), in the monitoring device 6, the flow returns to S21. On the other hand, when the analysis unit 66 determines that the problem has occurred (S42: No), the monitoring device 6 tries the restoration processing of "power-saving phase", which is stored in the analysis table 64 (S43). In addition, in the monitoring device 6, the flow proceeds to S50.

As described above, the monitoring device 6 identifies a phase of the communication between the server 1 and the KVM switch 2. In addition, when a problem has occurred, the monitoring device 6 executes the restoration processing, based on the identified phase and the analysis table 64. Therefore, the monitoring device 6 executes the restoration processing, for a known problem.

Figure 6A:
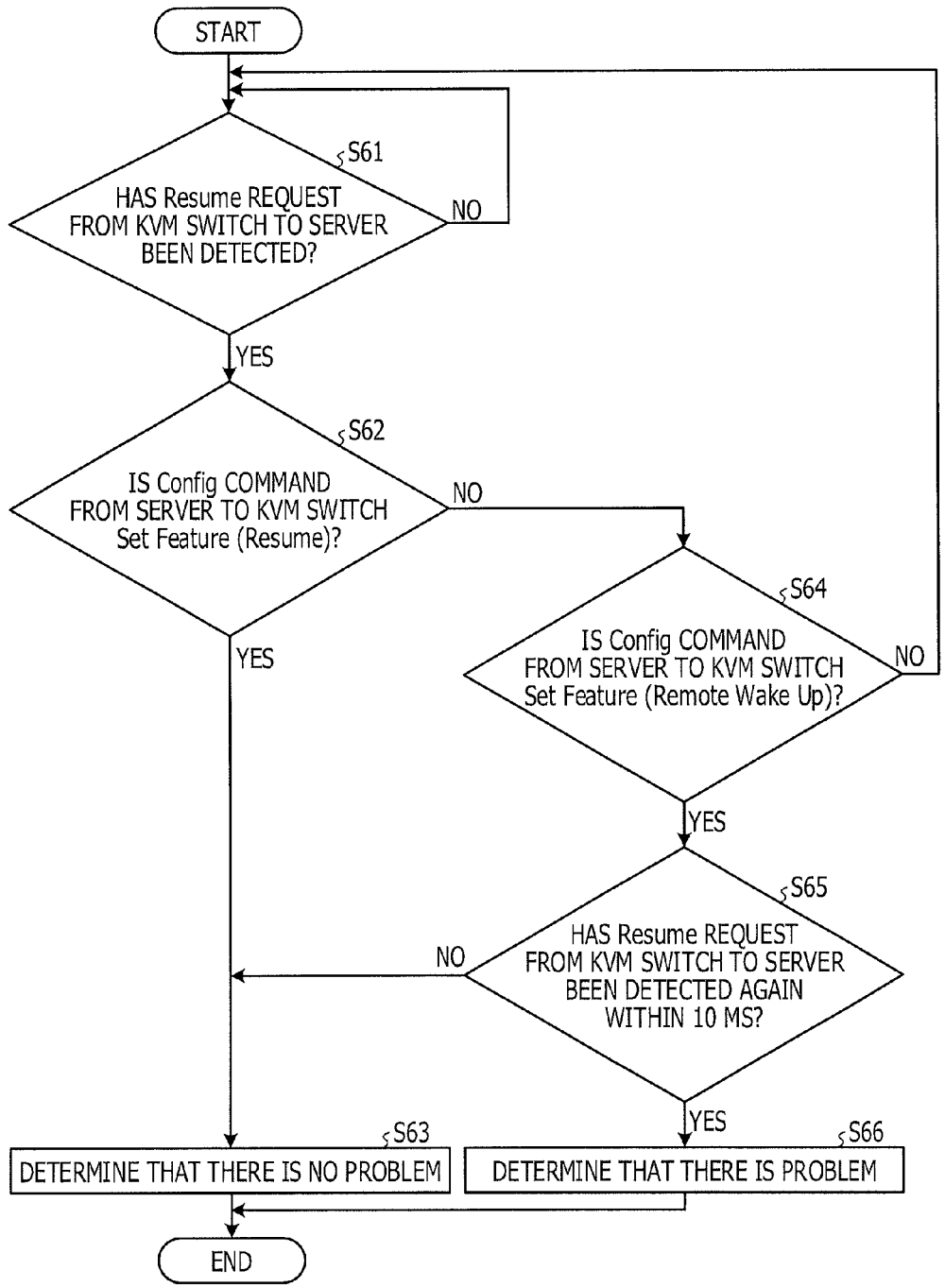
FIG. 6A is a flowchart illustrating a flow of problem detection processing in a power-saving phase.

A flow of problem detection processing of the power-saving phase is described below. FIG. 6A is a flowchart illustrating the flow of the problem detection processing of the power-saving phase. The processing of FIG. 6A corresponds to the processing of S42 illustrated in FIG. 5B.

As illustrated in FIG. 6A, the analysis unit 66 determines whether or not a Resume request from the KVM switch 2 to the server 1 has been detected (S61). Here, the Resume request is a request of power-saving phase termination from the KVM switch 2 to the server 1. In addition, the analysis unit 66 determines that a Resume request is not detected (S61: No), the analysis unit 66 repeats the detection of a Resume request.

On the other hand, when the analysis unit 66 determines that a Resume request has been detected (S61: Yes), the analysis unit 66 determines whether or not a Config command from the server 1 to the KVM switch 2 is "Set Feature (Resume)" (S62). Here, "Set Feature (Resume)" is a Resume instruction from the server 1 to the KVM switch 2, that is, a power-saving phase termination permission. In addition, when the analysis unit 66 determines that the Config command is "Set Feature (Resume)" (S62: Yes), the analysis unit 66 determines that a problem has not occur (S63), and the processing ends.

In the KVM switch 2, it is expected that a termination permission of the power-saving phase is received from the server 1, but the server 1 may not issue a Resume instruction immediately. At that time, depending on the operation of the KVM switch 2, a power-saving phase termination may be requested to the server 1 again immediately (within 10 ms in FIG. 6A). In such a case, between the KVM switch 2 and the server 1, a Resume request from the KVM switch 2 (return request to the ordinary usage phase) and a Remote Wake Up request from the server 1 (maintaining request of the power-saving mode) are repeated. As a result, the KVM switch 2 is not allowed to communicate with the server 1.

Here, when the analysis unit 66 determines that the Config command is not "Set Feature (Resume)" (S62: No), the analysis unit 66 determines whether or not the Config command from the server 1 to the KVM switch 2 is "Set Feature (Remote Wake Up)" (S64). When the analysis unit 66 determines that the Config command is not "Set Feature (Remote Wake Up)" (S64: No), in the analysis unit 66, the flow returns to S61.

On the other hand, the analysis unit 66 determines that the Config command is "Set Feature (Remote Wake Up)" (S64: Yes), the analysis unit 66 determines whether or not a Resume request from the KVM switch 2 to the server 1 has been detected again within 10 ms (S65). When the analysis unit 66 determines that the Resume request has been detected again within 10 ms (S65: Yes), the analysis unit 66 determines that a problem has occurred (S66). On the other hand, when the analysis unit 66 determines that the Resume request is not detected again within 10 ms (S65: No), the analysis unit 66 determines that a problem has not occurred (S63).

As described above, the analysis unit 66 may detect a problem that occurs in the power-saving phase, based on the Resume request from the KVM switch 2 to the server 1 and the power-saving phase termination permission from the server 1 to the KVM switch 2.

Figure 6B:
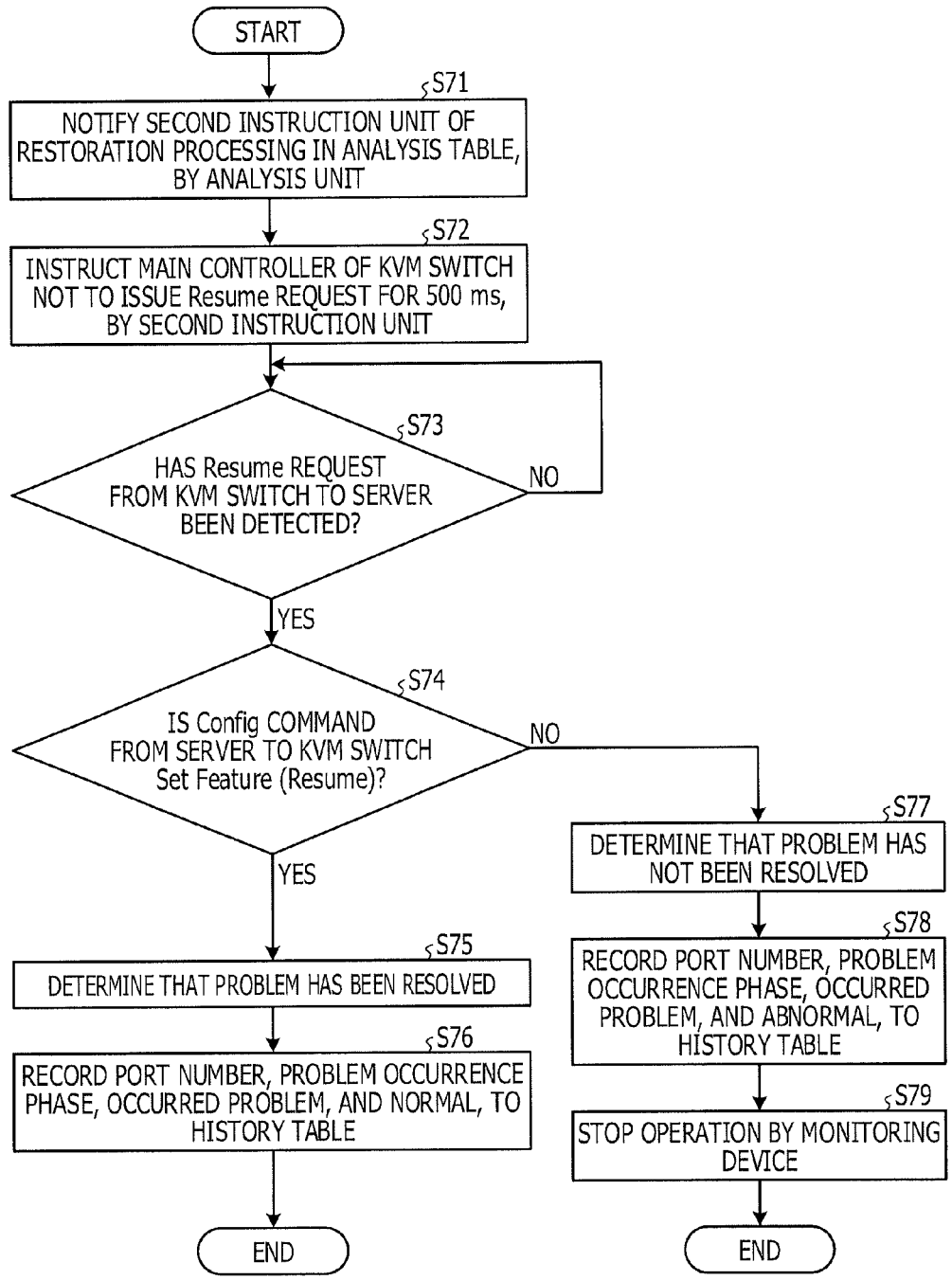
FIG. 6B is a flowchart illustrating a flow of restoration processing in the power-saving phase.

A flow of restoration processing of the power-saving phase is described below. FIG. 6B is a flowchart of the flow of the restoration processing of the power-saving phase. The processing of FIG. 6B corresponds to the processing of S43 illustrated in FIG. 5B.

As illustrated in FIG. 6B, the analysis unit 66 notifies the second instruction unit 68 of the restoration processing in the analysis table 64 (S71). After that, the second instruction unit 68 instructs the main controller 22 of the KVM switch 2 not to issue a Resume request for 500 ms (S72). After that, the analysis unit 66 determines whether or not the Resume request from the KVM switch 2 to the server 1 has been detected (S73). When the analysis unit 66 determines that the Resume request is not detected (S73: No), the analysis unit 66 repeats the detection.

On the other hand, when the analysis unit 66 determines that the Resume request has been detected (S73: Yes), the analysis unit 66 determines whether or not a Config command from the server 1 to the KVM switch 2 is "Set Feature (Resume)" (S74). When the analysis unit 66 determines that the Config command is "Set Feature (Resume)" (S74: Yes), the analysis unit 66 determines that the problem has been resolved (S75). After that, the recording unit 61 records a port number, a problem occurrence phase, that is, "power-saving phase", an occurred problem, and "normal", to the history table 63 (S76).

On the other hand, when the analysis unit 66 determines that the Config command is not "Set Feature (Resume)" (S74: No), the analysis unit 66 determines that the problem is not resolved (S77). In addition, the recording unit 61 records a port number, a problem occurrence phase, that is, "power-saving phase", an occurred problem, and "abnormal", to the history table 63 (S78). In addition, the monitoring device 6 stops the operation (S79).

As described above, when the recovery has been performed successfully by executing the restoration processing that is stored in the analysis table 64 through the second instruction unit 68, the server 1 is allowed to continue the verification processing of the connection compatibility.

Figure 7A:
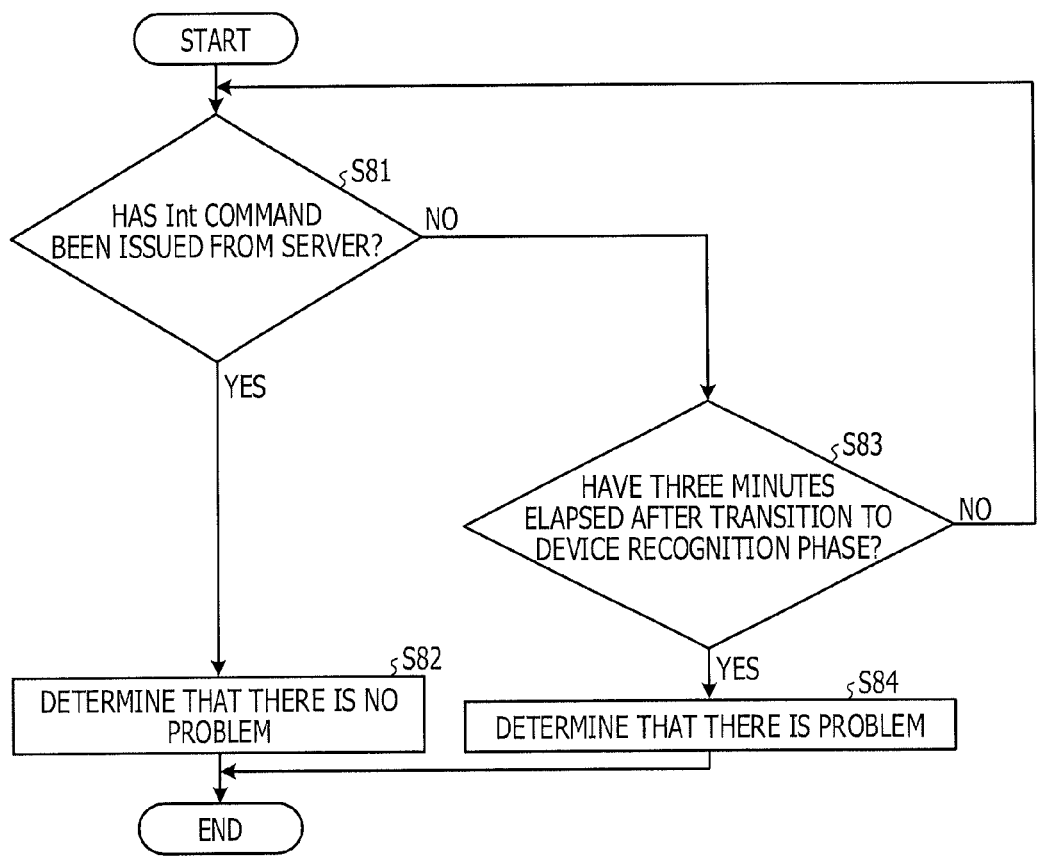
FIG. 7A is a flowchart illustrating a flow of problem detection processing in a device recognition phase.

A flow of problem detection processing of the device recognition phase is described below. FIG. 7A is a flowchart illustrating the flow of the problem detection processing of the device recognition phase. The processing of FIG. 7A corresponds to the processing of S36 illustrated in FIG. 5B.

As illustrated in FIG. 7A, the analysis unit 66 determines whether or not an Int command has been issued from the server 1 (S81). When the analysis unit 66 determines the Int command has been issued (S81: Yes), the phase transitions to the ordinary usage phase, so that the analysis unit 66 determines that there is no problem (S82).

On the other hand, when the analysis unit 66 determines that the Int command is not issued (S81: No), the analysis unit 66 determines whether or not three minutes have elapsed after the transition to the device recognition phase (S83). When the analysis unit 66 determines that three minutes do no elapse (S83: No), the flow returns to S81.

On the other hand, the analysis unit 66 determines that three minutes have elapsed (S83: Yes), the phase does not transition to the ordinary usage phase even after three minutes have elapsed, so that the analysis unit 66 determines that a problem has occurred (S84).

As described above, the analysis unit 66 may detect that a problem has occurred in the device recognition phase by determining whether or not the Int command has been issued before three minutes elapse after the transition to the device recognition phase.

Figure 7B:
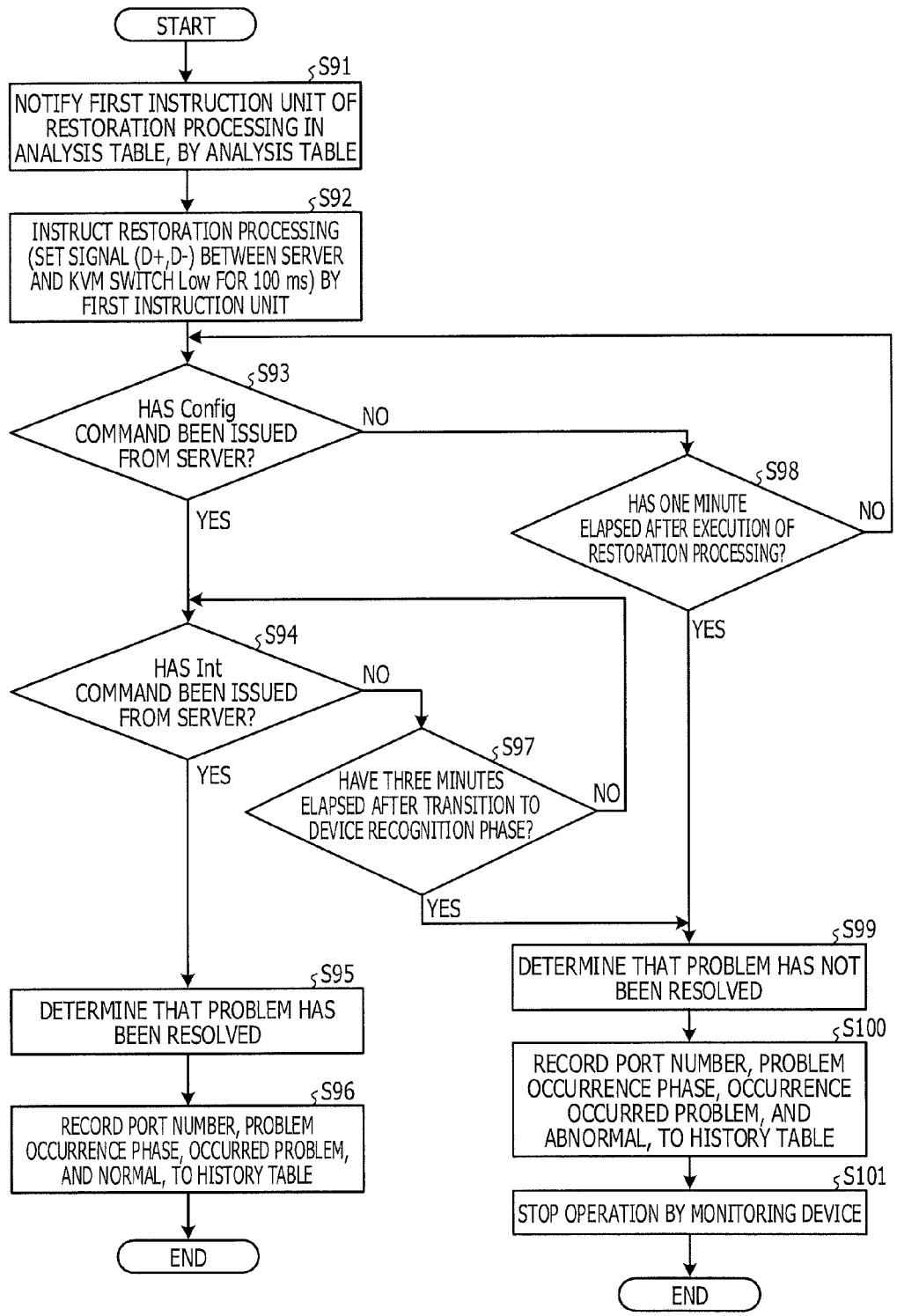
FIG. 7B is a flowchart illustrating a flow of restoration processing in the device recognition phase.

A flow of restoration processing of the device recognition phase is described below. FIG. 7B is a flowchart illustrating the flow of the restoration processing of the device recognition phase. The processing of FIG. 7B corresponds to the processing of S37 illustrated in FIG. 5B.

As illustrated in FIG. 7B, the analysis unit 66 notifies the first instruction unit 67 of the restoration processing in the analysis table 64 (S91). After that, the first instruction unit 67 instructs the restoration processing (S92). For example, the first instruction unit 67 instructs a signal (D+,D−) between the server 1 and the KVM switch 2 to become "Low" for 100 ms, promotes re-initialization, and causes the device recognition phase to be executed again from the beginning.

In addition, the analysis unit 66 determines whether or not a Config command has been issued from the server 1 (S93). When the analysis unit 66 determines that the Config command has been issued (S93: Yes), the analysis unit 66 determines whether or not an Int command has been issued from the server 1 (S94). When the analysis unit 66 determines that the Int command has been issued from the server 1 (S94: Yes), the analysis unit 66 determines that the problem has been resolved (S95). After that, the recording unit 61 records a port number, a problem occurrence phase, that is, "device recognition phase", an occurred problem, and "normal", to the history table 63 (S96).

On the other hand, when the analysis unit 66 determines that the Int command is not issued (S94: No), the analysis unit 66 determines whether or not three minutes have elapsed after the transition to the device recognition phase (S97). When the analysis unit 66 determines that three minutes do not elapse even after the transition to the device recognition phase (S97: No), the flow returns to S94.

On the other hand, when the analysis unit 66 determines that three minutes have elapsed after the transition to the device recognition phase (S97: Yes), the phase does not transition to the ordinary usage phase even after three minutes have elapsed, so that in the analysis unit 66, the flow proceeds to S99. When the analysis unit 66 determines that the Config command is not issued from the server 1 (S93: No), the analysis unit 66 determines whether or not one minute has elapsed after execution of the restoration processing (S98). When the analysis unit 66 determines that one minute does not elapse (S98: No), the flow returns to S93.

On the other hand, when the analysis unit 66 determines that one minute has elapsed (S98: Yes), the analysis unit 66 determines that the problem has not been resolved (S99). After that, the recording unit 61 records a port number, a problem occurrence phase, that is, "device recognition phase", an occurred problem, and "abnormal", to the history table 63 (S100), and the monitoring device 6 stops the operation (S101).

As described above, when the recovery has been performed successfully by executing the restoration processing that is stored in the analysis table 64 through the first instruction unit 67, the server 1 is allowed to continue the verification processing of the connection compatibility.

As described above, in the embodiments, the analysis table 64 stores the restoration processing of a known problem, for the communication between the server 1 and the KVM switch 2. In addition, the detection unit 65 detects the communication between the server 1 and the KVM switch 2, and the analysis unit 66 determines whether or not the communication is being performed normally. In addition, when a failure occurs in the communication, the first instruction unit 67 or the second instruction unit 68 executes the restoration processing, based on the analysis table 64. Thus, when the restoration processing has been executed successfully, the server 1 is allowed to continue the verification of the connection compatibility, and a work time period of the verification may be reduced.

In the embodiments, the analysis unit 66 executes the failure detection and the restoration processing for each of the phases of the communication. Thus, the monitoring device 6 may execute accurate failure detection and appropriate restoration processing.

In the embodiments, the recording unit 61 and the analysis unit 66 are described above, but the functions that are included in the recording unit 61 and the analysis unit 66 may be also achieved by software. Here, a monitoring device is described below that achieves the functions that are included in the recording unit 61 and the analysis unit 66 by the software.

Figure 8:
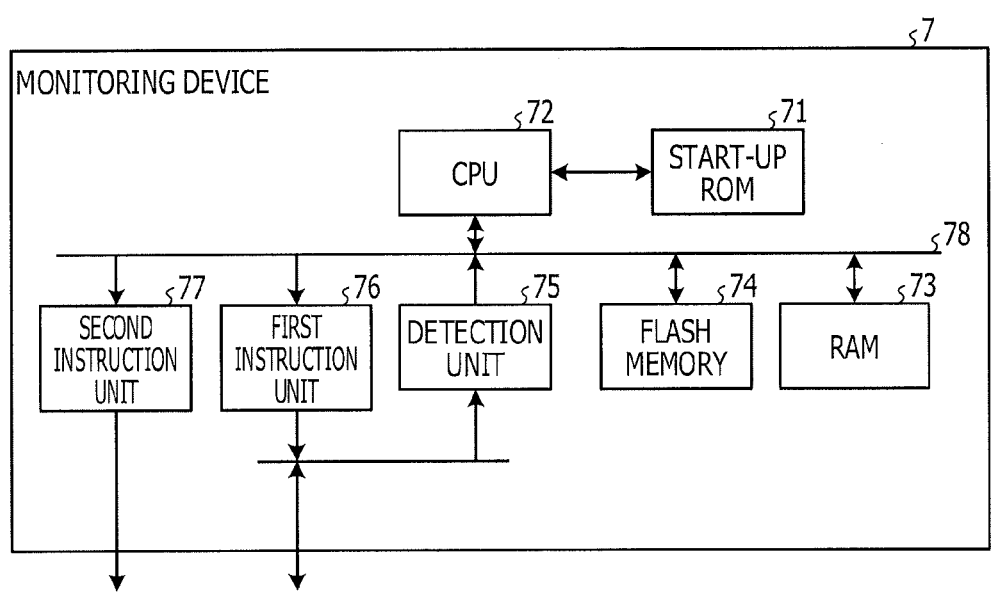
FIG. 8 is a diagram illustrating a configuration of a monitoring device that achieves by a software functions that a recording unit and an analysis unit have.
Figure 9:
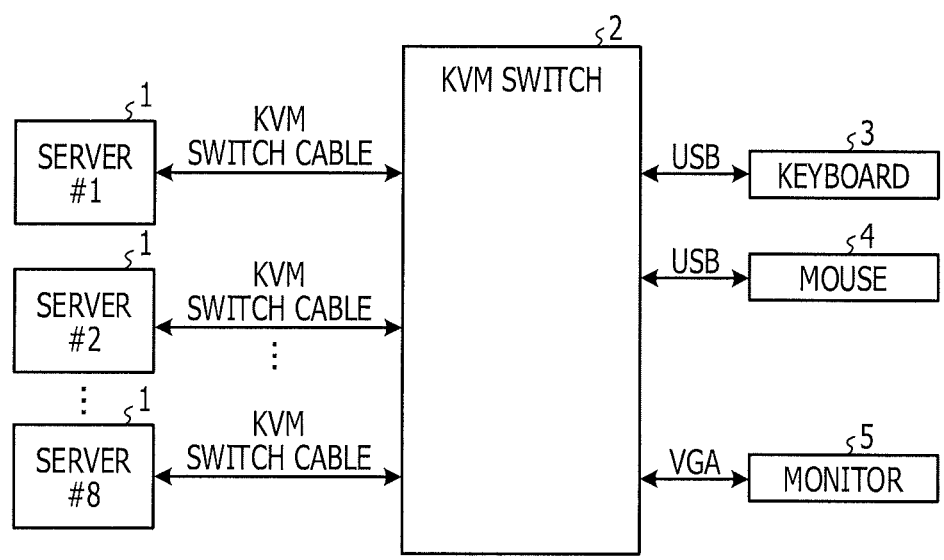
FIG. 9 is a diagram illustrating a KVM switch.

FIG. 8 is a diagram illustrating a configuration of a monitoring device 7 that achieves the functions that are included in the recording unit 61 and the analysis unit 66 by software. As illustrated in FIG. 8, the monitoring device 7 includes a start-up Read Only Memory (ROM) 71, a Central Processing Unit (CPU) 72, a Random Access Memory (RAM) 73, a Flash memory 74, a detection unit 75, a first instruction unit 76, and a second instruction unit 77.

The start-up ROM 71 is a read-only memory that stores a monitoring program that achieves the functions that are included in the recording unit 61 and the analysis unit 66. The CPU 72 is a central processing device that reads the monitoring program from the start-up ROM 71 and executes the monitoring program. The RAM 73 is a memory that stores a result in the middle of execution of the monitoring program and the like. The RAM 73 may be used as the command buffer 62 as well.

The Flash memory 74 is a non-volatile memory that stores the analysis table 64 and the history table 63. The detection unit 75, the first instruction unit 76, and the second instruction unit 77 respectively correspond to the detection unit 65, the first instruction unit 67, and the second instruction unit 68 illustrated in FIG. 1. The start-up ROM 71, the CPU 72, the RAM 73, the Flash memory 74, the detection unit 75, the first instruction unit 76, and the second instruction unit 77 are coupled to each other through a bus 78.

In the embodiments, the case is described above in which the keyboard 3, the mouse 4, and the monitor 5 are coupled to the KVM switch 2. However, the embodiments are not limited to such a case, and may be applied to a case in which a further peripheral device such as a recording device is coupled to a switch that is similar to the KVM switch 2.

In the embodiments, the case is described above in which the server 1 is switched by the KVM switch 2. However, the embodiment is not limited to the case, and similarly, may be applied to a case in a further computer is switched by the KVM switch 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring method that is executed by a monitoring device that monitors communication between an information processing device from among a plurality of information processing devices and a switching device that is coupled to a peripheral device that includes at least one of an input device and an output device, the monitoring method comprising:
    storing information on a recovery method for each process of the communication, in a memory;
    detecting the communication between the information processing device and the switching device;
    determining whether a failure has occurred in the detected communication by analyzing the detected communication for each of the processes;
    executing restoration processing of recovering the detected communication, based on information on the recovery method corresponding to a failed process among the processes, which is stored in the memory when it is determined that the failure has occurred in the detected communication;
    determining whether the restoration processing has been executed successfully;
    continuing to monitor the communication between the information processing device and the switching device when it is determined that the restoration processing has been executed successfully; and
    controlling the monitoring of the communication between the information processing device and the switching device to be stopped when it is not determined that the restoration processing has been executed successfully.

2. The monitoring method according to claim 1, further comprising
    storing a content of the failure and a result of the restoration processing in the memory when it is determined that the failure has occurred in the detected communication.

3. The monitoring method according to claim 1,
    wherein the detecting includes detecting the communication that is performed when connection compatibility between the switching device and the information processing device is verified.

4. The monitoring method according to claim 1,
    wherein the storing includes storing information on a recovery method that corresponds to a power-saving phase in which the switching device is in a power-saving state from among the processes, in the memory.

5. The monitoring method according to claim 4,
    wherein the determining whether the failure has occurred in the detected communication includes determining whether the failure has occurred in the power-saving phase, based on a request to release the power-saving state, which is transmitted from the switching device to the information processing device, and a request to release the power-saving state, which is transmitted from the information processing device to the switching device.

6. The monitoring method according to claim 4,
    wherein the determining whether the restoration processing has been executed successfully includes determining whether the restoration processing has been executed successfully in the power-saving phase, based on a request to release the power-saving state, which is transmitted from the switching device to the information processing device, and an instruction to release the power-saving state, which is transmitted from the information processing device to the switching device.

7. The monitoring method according to claim 1,
    wherein the storing includes storing information on recovery methods that respectively correspond to a device recognition phase in which the information processing device is in a state of recognizing a connection device, and an ordinary usage phase in which normal communication is being performed between the information processing device and the switching device from among the processes.

8. The monitoring method according to claim 4,
    wherein the determining whether the failure occurs in the detected communication includes determining whether the failure has occurred in a device recognition phase, based on a transition instruction to an ordinary usage phase, which is transmitted from the information processing device to the switching device, and a time that has elapsed after the transition to the device recognition phase.

9. The monitoring method according to claim 4, wherein the determining whether the restoration processing has been executed successfully includes determining whether the restoration processing has been executed successfully in a device recognition phase, based on a transition instruction to an ordinary usage phase, which is transmitted from the information processing device to the switching device, and a time that has elapsed after the transition to the device recognition phase.

10. A monitoring device that monitors a communication through a switching device between an information processing device from among a plurality of information processing devices and a peripheral device that includes at least one of an input device and an output device, the monitoring device comprising:

a memory; and a processor coupled to the memory and configured to:

store information on a recovery method for each process of the communication, in the memory, detect the communication between the information processing device from among the plurality of information processing devices, and the switching device, determine whether a failure has occurred in the detected communication by analyzing the detected communication for each of the processes, execute restoration processing of recovering the detected communication, based on information on the recovery method corresponding to a failed process among the processes, which is stored in the memory when it is determined that the failure has occurred in the detected communication, determine whether the restoration processing has been executed successfully, continue to monitor the communication between the information processing device and the switching device when it is determined that the restoration processing has been executed successfully, and control the monitoring of the communication between the information processing device and the switching device to be stopped when it is not determined that the restoration processing has been executed successfully.

11. The monitoring device according to claim 10, wherein the processor is configured to store a content of the failure and a result of the restoration processing in the memory when it is determined that the failure has occurred in the detected communication.

* * * * *